US008055763B2

(12) United States Patent
Yoo et al.

(10) Patent No.: US 8,055,763 B2
(45) Date of Patent: Nov. 8, 2011

(54) SYSTEM AND METHOD FOR PROCESSING SENSING DATA FROM SENSOR NETWORK

(75) Inventors: Jae-Jun Yoo, Daejon (KR); Do-Hyun Kim, Daejon (KR); Mi-Jeong Kim, Daejon (KR); Byung-Tae Jang, Daejon (KR); Jong-Hyun Park, Daejon (KR); Jeong-Dan Choi, Daejon (KR); Myung-Hee Son, Daejon (KR); Jung-Sook Kim, Seoul (KR); Kyung-Bok Sung, Daejon (KR); Jae-Han Lim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 584 days.

(21) Appl. No.: 11/872,104

(22) Filed: Oct. 15, 2007

(65) Prior Publication Data

US 2008/0106406 A1 May 8, 2008

(30) Foreign Application Priority Data

Nov. 6, 2006 (KR) .................. 10-2006-0109122

(51) Int. Cl.
*G06F 15/173* (2006.01)
(52) U.S. Cl. ..................................... 709/224
(58) Field of Classification Search .................. 709/224
See application file for complete search history.

(56) References Cited

U.S. PATENT DOCUMENTS 7,093,023 B2 * 8/2006 Lockwood et al. ........... 709/231
7,552,222 B2 * 6/2009 Garimella et al. ............ 709/229
2002/0055998 A1 * 5/2002 Riddle et al. ................. 709/224
2002/0143908 A1 * 10/2002 Taggart et al. ................ 709/223
2003/0014517 A1 * 1/2003 Lindsay et al. ............... 709/224
2003/0046382 A1 * 3/2003 Nick ............................. 709/224
2004/0249563 A1 12/2004 Otsuki et al.

(Continued)

FOREIGN PATENT DOCUMENTS

KR 1020060058975 6/2006

(Continued)

OTHER PUBLICATIONS

Yongjun Xu; Lingyi Liu; Peifu Shen; Tao Lv; Xiaowei Li, "Low power processor design for wireless sensor network applications," Wireless Communications, Networking and Mobile Computing, 2005. Proceedings. 2005 International Conference on, vol. 2, no., pp. 921-924, Sep. 23-26, 2005.*

(Continued)

*Primary Examiner* — Ajay Bhatia
(74) *Attorney, Agent, or Firm* — Ladas & Parry LLP

(57) ABSTRACT

Provided are a system and method for processing sensing data from a sensor network. The system includes: a data processing condition managing unit for storing sensing data processing conditions; a data processing function managing unit for storing sensing data processing function information; a processed data managing unit for storing processed sensing data; a data pattern managing unit for storing sensing data pattern information; an acquired data managing unit for storing sensing data; a data acquisition condition managing unit for storing sensing data acquisition conditions; a user requirement acquiring unit for acquiring the sensing data acquisition conditions; a data acquiring unit for acquiring sensing data; a data pattern extracting unit for extracting the pattern of sensing data; a data generating unit for processing the sensing data; and a data processing unit for processing the sensing data.

10 Claims, 7 Drawing Sheets

U.S. PATENT DOCUMENTS

2005/0144284 A1 * 6/2005 Ludwig et al. ............... 709/226
2006/0149905 A1    7/2006 Park et al.
2006/0168070 A1 * 7/2006 Thompson et al. .......... 709/206

FOREIGN PATENT DOCUMENTS

| KR | 1020060059642 | 6/2006 |
|---|---|---|
| KR | 1020060065362 | 6/2006 |
| KR | 1020060065465 | 6/2006 |

OTHER PUBLICATIONS

Iang, S., Cao, Y., Iyengar, S., Kuryloski, P., Jafari, R., Xue, Y., Bajcsy, R., and Wicker, S. 2008. CareNet: an integrated wireless sensor networking environment for remote healthcare. In Proceedings of the ICST 3rd international Conference on Body Area Networks (Tempe, Arizona, Mar. 13-17, 2008).*

Korean Notice of Patent Grant dated Jul. 30, 2007 for the corresponding application KR 10-2006-0109122.

* cited by examiner

FIG. 3

| Sensing data pattern | Sensing data pattern length | Pattern frequency | Sensing data pattern occurrence probability | Sensing data processing function | Miscellaneous |
|---|---|---|---|---|---|
| Abcdef | 6 | 5 | (a, 20%) (b, 5%)... (f, 20%) | F1 | |
| defacfs | 7 | 3 | (x, 2%) (e, 25%)... (z, 39%) | f3 | |
| ... | ... | ... | ... | ... | ... |
| siensof | 7 | 9 | (p, 23%) (r, 12%)... (z, 10%) | f5 | |

- 301: Sensing data pattern
- 302: Sensing data pattern length
- 303: Pattern frequency
- 304: Sensing data pattern occurrence probability
- 305: Sensing data processing function
- 306: Miscellaneous Miscellaneous information 1 about sensing data pattern
Miscellaneous information 2 about sensing data pattern
Miscellaneous information 3 about sensing data pattern

SYSTEM AND METHOD FOR PROCESSING SENSING DATA FROM SENSOR NETWORK

CROSS-REFERENCE(S) TO RELATED APPLICATIONS

The present invention claims priority of Korean Patent Application Nos. 10-2006-0109122, filed on Nov. 6, 2006, which is incorporated herein by reference.

BACKGROUND OF THE INVENTION

1. Field of the Invention

The present invention relates to a system and method for processing sensing data from a sensor network; and, more particularly, to a system and method for processing sensing data from a sensor network, which extracts/generates sensing data from sensing information (or data) acquired from a ubiquitous sensor network using information about a sensor node and the sensor network and the pattern of sensing data that have been acquired so far, processes the extracted/generated sensing data according to a sensing data processing procedure (function and algorithm) set by a user and an application service, and provides a new application service to the user according to the processing results.

This work was supported by the Information Technology (IT) research and development program of the Korean Ministry of Information and Communication (MIC) and/or the Korean Institute for Information Technology Advancement (IITA) [2007-S001-01, "Development of Telematics Application Service Technology based on USN Infrastructure"].

2. Description of Related Art

Recently, since a variety of sensor networks are installed and used, it is very important to process data, which have been collected and acquired from the sensor networks, and to provide the processed data to an application service.

Depending on the types of sensing data and the types of application service, methods for acquiring data from sensor networks can be broadly classified into a push-type data acquiring method and a full-type data acquiring method. In the push-type data acquiring method, a sensor network provides sensing data to an application service when predetermined conditions are satisfied, which is performed asynchronously in general. In the full-type data acquiring method, an application service requests sensing data from a sensing network at a predetermined time by transmission of an inquiry. A procedure for acquiring/processing sensing data in a system managing a sensor network varies structurally depending on whether the data acquiring method is of the push type or the full type.

Extensive research is being conducted to develop technologies for sensing data in a sensor network and managing/transferring (routing) data in a sensor node of the sensor network, in conjunction with the sensing network system and service. However, research to develop technology for data processing in the system managing the sensor network after acquisition of sensing data from the sensor network are not extensive.

What is therefore required is a scheme for acquiring/processing sensing data according to user settings in order to provide the optimized new application service to the user in the system and service using the push-type data acquiring method.

SUMMARY OF THE INVENTION

An embodiment of the present invention is directed to providing a system and method for processing sensing data from a sensor network, which extracts/generates sensing data from sensing information or data acquired from a ubiquitous sensor network using information about a sensor node and the sensor network and the pattern of sensing data that have been acquired so far, processes the extracted/generated sensing data according to a sensing data processing procedure (function and algorithm) set by a user and an application service, and provides a new application service to the user according to the processing results.

In accordance with an aspect of the present invention, there is provided a system for processing sensing data, the system including: a data processing condition managing unit for storing sensing data processing conditions, sensing data process conditions, and sensing data report format information in a sensing data processing condition storing unit and managing the stored data; a data processing function managing unit for storing sensing data processing function information in a sensing data processing function storing unit and managing the stored data; a processed data managing unit for storing processed sensing data in a processed sensing data storing unit and managing the stored data; a data pattern managing unit for storing sensing data pattern information in a sensing data pattern storing unit and managing the stored data; an acquired data managing unit for storing acquired sensing data in an acquired sensing data storing unit and managing the stored data; a data acquisition condition managing unit for storing sensing data acquisition conditions in a sensing data acquisition condition storing unit and managing the stored data; a user requirement acquiring unit for acquiring the sensing data acquisition conditions, the sensing data processing conditions, the sensing data pattern information, the sensing data processing function information, and the sensing data report format information from a user and an application service; a data acquiring unit for acquiring sensing data from a sensor network on the basis of the sensing data acquisition conditions; a data pattern extracting unit for extracting the pattern of sensing data received from the data acquiring unit and the acquired data managing unit on the basis of the sensing data pattern information received from the data pattern managing unit; a data generating unit for processing the sensing data received from the data acquiring unit and the acquired data managing unit according to the sensing data processing conditions received from the data processing condition managing unit; and a data processing unit for processing the sensing data received from the data acquiring unit and the acquired data managing unit or the processed sensing data received from the data generating unit and the processed data managing unit on the basis of the sensing data processing function and the sensing data processing conditions received from the data processing function managing unit and the data processing condition managing unit.

In accordance with another aspect of the present invention, there is provided a method for processing sensing data, the method including the steps of: a) acquiring sensing data acquisition conditions, sensing data processing conditions, sensing data pattern information, sensing data processing function information, and sensing data report format information from a user and an application service; b) acquiring sensing data from a sensor network on the basis of the sensing data acquisition conditions; c) checking whether the pattern of the acquired sensing data is to be updated on the basis of the sensing data pattern information, and extracting the sensing data pattern according to the check results; d) determining whether the acquired sensing data are to be processed on the basis of the sensing data processing conditions, and processing the sensing data according to the determination results; e) processing the acquired sensing data or the processed sensing data on the basis of the sensing data processing function information and the sensing data processing conditions; and f) reporting the acquired sensing data, the acquired sensing data pattern, the processed sensing data, and the process sensing data according to the sensing data report format information.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 3 illustrates sensing data pattern information in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter. In addition, if it is considered that detailed description on a related art may obscure the points of the present invention, the detailed description will not be provided herein. The preferred embodiments of the present invention will be described in detail hereinafter with reference to the attached drawings.

Figure 1:
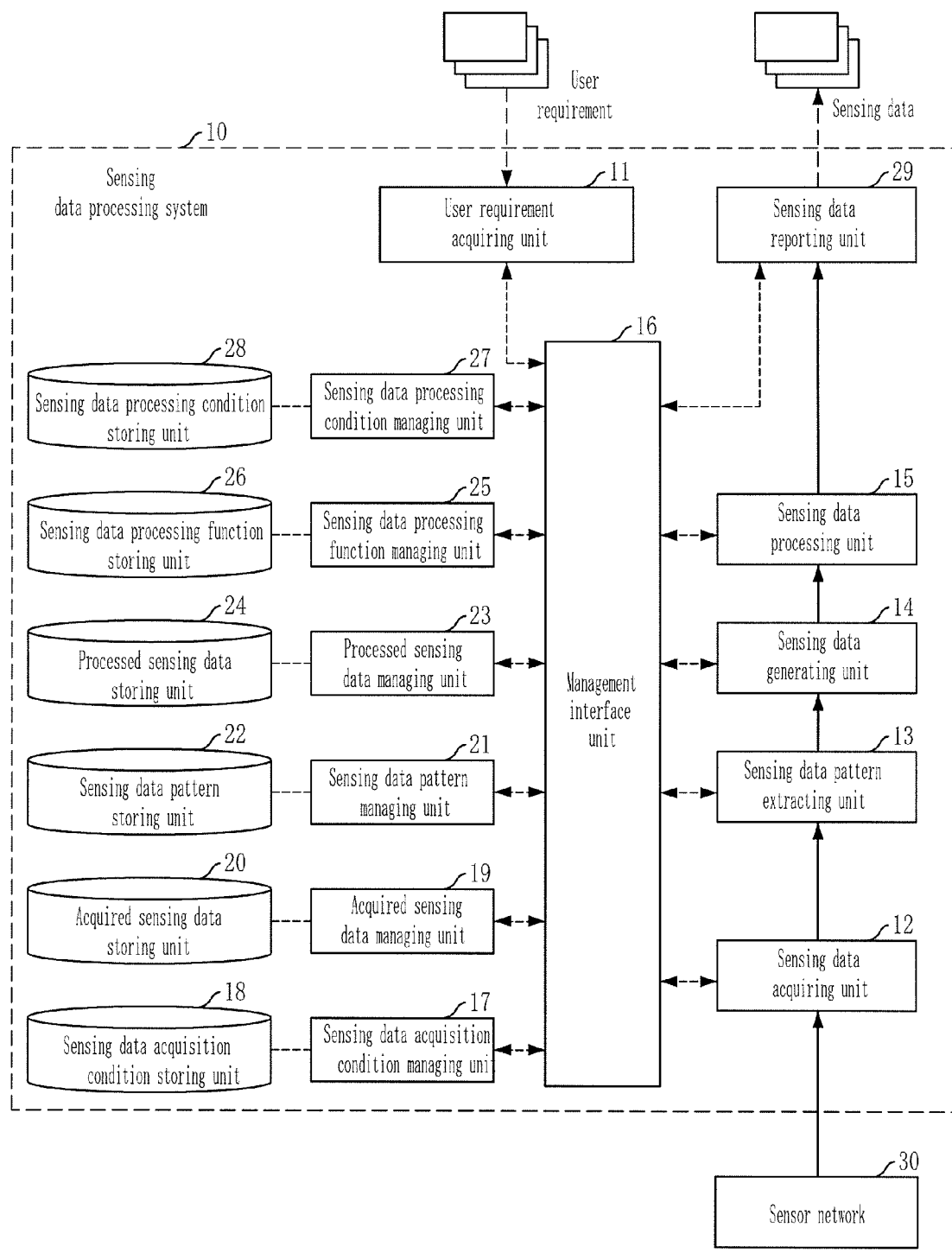
FIG. 1 is a block diagram of a sensing data processing system in accordance with an embodiment of the present invention.

FIG. 1 is a block diagram of a sensing data processing system in accordance with an embodiment of the present invention.

Referring to FIG. 1, a sensing data processing system 10 in accordance with an embodiment of the present invention includes a user requirement acquiring unit 11, a sensing data acquiring unit 12, a sensing data pattern extracting unit 13, a sensing data generating unit 14, a sensing data processing unit 15, a management interface unit 16, a sensing data acquisition condition managing unit 17, a sensing data acquisition condition storing unit 18, an acquired sensing data managing unit 19, an acquired sensing data storing unit 20, a sensing data pattern managing unit 21, a sensing data pattern storing unit 22, a processed sensing data managing unit 23, a processed sensing data storing unit 24, a sensing data processing function managing unit 25, a sensing data processing function storing unit 26, a sensing data processing condition managing unit 27, a sensing data processing condition storing unit 28, and a sensing data reporting unit 29. The sensing data processing system 10 processes sensing data received from a sensor network 30.

Hereinafter, the functions of the units of the sensing data processing system 10 will be described in more detail.

The user requirement acquiring unit 11 acquires user requirement information received from a user or an application service, checks the validity of the user requirement information, and transfers the checked user requirement information to the corresponding managing unit through the management interface unit 16. Examples of the user requirement information include information related to processing of sensing data and sensing data report format information.

Examples of the information related to processing of sensing data include sensing data acquisition conditions, sensing data processing conditions, sensing data pattern information, and sensing data processing function information. Examples of the sensing data report format information include acquired sensing data report format information and processed sensing data report format information.

The sensing data acquisition condition is transferred to the sensing data acquisition condition managing unit 17, and the sensing data processing condition is transferred to the sensing data processing condition managing unit 27. Also, the sensing pattern information is transferred to the sensing data pattern managing unit 21, and the sensing data processing function information is transferred to the sensing data processing function managing unit 25. Also, the acquired sensing data report format information and the processed sensing data report information are transferred to the sensing data processing condition managing unit 27.

The sensing data acquiring unit 12 acquires sensing data from the sensor network 30 according to the sensing data acquisition condition that is received from the sensing data acquisition condition managing unit 17 through the management interface unit 16. The sensing data acquiring unit 12 transfers sensing data acquired from the sensor network 30 to the sensing data reporting unit 29. Also, the sensing data acquiring unit 12 transfers the acquired sensing data to the acquired sensing data managing unit 19 through the management interface unit 16, or transfers the acquired sensing data to the sensing data pattern extracting unit 13.

The sensing data pattern extracting unit 13 extracts a sensing data pattern based on sensing data that have been acquired so far. The sensing data pattern extracting unit 13 may receive the sensing data, which have been acquired so far, from the sensing data acquiring unit 12 or from the acquired sensing data managing unit 19.

In order to extract the sensing data pattern, the sensing data pattern extracting unit 13 may refer to information that has been received through the management interface unit 16 from each of the sensing data acquisition condition managing unit 17, the acquired sensing data managing unit 19, the sensing data pattern managing unit 21, the processed sensing data managing unit 23, and the sensing data processing condition managing unit 27. Examples of the received information include sensing data acquisition conditions, sensing data that have been acquired so far, the previous sensing data pattern information, sensing data that have been processed so far, and sensing data processing conditions.

The sensing data pattern extracting unit 13 transfers the extracted sensing data pattern to the sensing data pattern managing unit 21 through the management interface unit 16, and transfers the extracted sensing data pattern to the sensing data generating unit 14 or to the sensing data reporting unit 29.

The sensing data pattern extracted by the sensing data pattern extracting unit 13 can improve the performance of processing sensing data, and may be necessary for predicting the next sensing data. Alternatively, the sensing data pattern may not be extracted at the request of the user and the application service.

The sensing data generating unit 14 processes sensing data, which have been acquired by the sensing data acquiring unit 12, to generate new data. The sensing data generating unit 14 may receive the sensing data, which have been acquired by the sensing data acquiring unit 12, from the sensing data pattern extracting unit 13 or from the acquired sensing data managing unit 19.

In order to process the acquired sensing data, the sensing data generating unit 14 may refer to information that has been received through the management interface unit 16 from each of the sensing data acquisition condition managing unit 17, the sensing data pattern managing unit 21, the processed sensing data managing unit 23, and the sensing data processing condition managing unit 27. Examples of the received information include sensing data that have been acquired so far, a sensing data pattern, sensing data that have been processed so far, sensing data processing conditions, sensing data processing function information, and sensing data process conditions.

The sensing data generating unit 14 transfers the new data to the sensing data processing unit 15 or to the sensing data reporting unit 29. Also, the sensing data generating unit 14 may transfer the new data to the processed sensing data managing unit 23 according to the sensing data processing conditions.

Examples of the sensing data processed by the sensing data generating unit 14 include statistic data of acquired actual sensing data and a change in the actual sensing data. The processed sensing data may vary depending on the user requirement information that has been acquired by the user requirement acquiring unit 11.

Alternatively, the sensing data acquired by the sensing data acquiring unit 12 may not be processed at the request of the user and the application service.

Using an external sensing data processing function, which is a sensing data processing function received from the user or the application service, or an internal sensing data processing function, which is a sensing data processing function internally provided, the sensing data processing unit 15 processes sensing data, which have been acquired by the sensing data acquiring unit 12, or sensing data, which have been processed by the sensing data generating unit 14.

The sensing data processing unit 15 may receive the sensing data, which have been acquired by the sensing data acquiring unit 12, from the sensing data acquiring unit 12 or from the acquired sensing data managing unit 19. The sensing data processing unit 15 may receive the sensing data, which have been processed by the sensing data generating unit 14, from the sensing data generating unit 14 or from the processed sensing data managing unit 23.

In order to process the sensing data acquired by the sensing data acquiring unit 12 or the sensing data processed by the sensing data generating unit 14, the sensing data processing unit 15 may refer to information that has been received through the management interface unit 16 from each of the sensing data acquisition condition managing unit 17, the acquired sensing data managing unit 19, the sensing data pattern managing unit 21, the processed sensing data managing unit 23, the sensing data processing function managing unit 25, and the sensing data processing condition managing unit 27. Examples of the received information include sensing data acquisition conditions, acquired sensing data, a sensing data pattern, sensing data processed on the basis of the previous sensing data, sensing data processing function information for calling another function during the execution of a processing function, and sensing data process conditions.

The sensing data processing unit 15 transfers the processed sensing data to the sensing data reporting unit 29.

The sensing data processing unit 15 may call a user-level processing function, i.e., an external processing function, from the user requirement acquiring unit 11 according to the sensing data processing results. That is, the sensing data processing unit 15 may call a user-level processing function, i.e., an external processing function, from the user requirement acquiring unit 11 immediately after the processing of predetermined sensing data, and may provide the details, i.e., algorithm of the called user-level processing function to the sensing data processing function managing unit 25.

The management interface unit 16 provides and manages an interface for transferring data from the user requirement acquiring unit 11, the sensing data acquiring unit 12, the sensing data pattern extracting unit 13, the sensing data generating unit 14, and the sensing data reporting unit 29 to the sensing data acquisition condition managing unit 17, the acquired sensing data managing unit 19, the sensing data pattern managing unit 21, the processed sensing data managing unit 23, and the sensing data processing condition managing unit 27.

The sensing data acquisition condition managing unit 17 receives sensing data acquisition conditions from the user requirement acquiring unit 11 through the management interface unit 16, stores the received sensing data acquisition conditions in the sensing data acquisition condition storing unit 18, searches/deletes the stored sensing data acquisition conditions, and provides information about the sensing data acquisition conditions to the sensing data acquiring unit 12, the sensing data pattern extracting unit 13, the sensing data generating unit 14, and the sensing data processing unit 15.

The sensing data acquisition condition storing unit 18 stores the information about the sensing data acquisition conditions and is managed by the sensing data acquisition condition managing unit 17.

The acquired sensing data managing unit 19 receives sensing data from the sensing data acquiring unit 12 through the management interface unit 16, stores the received sensing data in the sensing data storing unit 20, searches/deletes the stored sensing data, and provides the acquired sensing data to the sensing data pattern extracting unit 13 and the sensing data processing unit 15.

The acquired sensing data storing unit 20 stores the sensing data acquired by the sensing data acquiring unit 12 and is managed by the acquired sensing data managing unit 19.

The sensing data pattern managing unit 21 receives sensing data pattern information through the management interface unit 16, stores the received sensing data pattern information in the sensing data pattern storing unit 22, searches/deletes the stored sensing data pattern information, and provides the sensing data pattern information to the sensing data pattern extracting unit 13, the sensing data generating unit 14, and the sensing data processing unit 15.

The sensing data pattern storing unit 22 stores the sensing data pattern information and is managed by the sensing data pattern managing unit 21.

The processed sensing data managing unit 23 receives processed sensing data through the management interface unit 16, stores the received processed sensing data in the processed sensing data storing unit 24, searches/deletes the stored processed sensing data, and provides the processed sensing data to the sensing data pattern extracting unit 13, the sensing data generating unit 14, and the sensing data processing unit 15.

The processed sensing data storing unit 24 stores the processed sensing data and is managed by the processed sensing data managing unit 23.

The sensing data processing function managing unit 25 receives information about sensing data processing functions including an external sensing data processing function and an internal sensing data processing function, through the management interface unit 16, stores the received sensing data processing function information in the sensing data processing function storing unit 26, searches/deletes the stored sensing data processing function information, and provides the sensing data processing function information to the sensing data generating unit 14 and the sensing data processing unit 15.

The sensing data processing function storing unit 26 stores the information about sensing data processing functions, including an external sensing data processing function and an internal sensing data processing function, and is managed by the sensing data processing function managing unit 25.

The external sensing data processing function information stored in the sensing data processing function storing unit 26 include the sensing data processing function information acquired by the user requirement acquiring unit 11 and the user-level processing function information called by the sensing data processing unit 15.

The sensing data processing condition managing unit 27 receives the sensing data processing conditions, the sensing data process conditions, and the sensing data report format information including the acquired sensing data report format information and the processed sensing data report format information, through the management interface unit 16, stores the above information in the sensing data processing condition storing unit 28, searches/deletes the stored information, and provides the sensing data processing conditions, the sensing data process conditions, and the sensing data report format information to the sensing data pattern extracting unit 13, the sensing data generating unit 14, and the sensing data processing unit 15.

The sensing data processing condition storing unit 28 stores the sensing data processing conditions, the sensing data process conditions, and the sensing data report format information, and is managed by the sensing data processing condition managing unit 27.

The sensing data reporting unit 29 receives the sensing data report format information from the sensing data processing condition managing unit 27. According to the received sensing data report format information, the sensing data reporting unit 29 provides the user or the application service with the acquired sensing data, the sensing data pattern information, the processed sensing data, and the process sensing data that have been received from the sensing data acquiring unit 12, the sensing data pattern extracting unit 13, the sensing data generating unit 14, and the sensing data processing unit 15.

Figure 2:
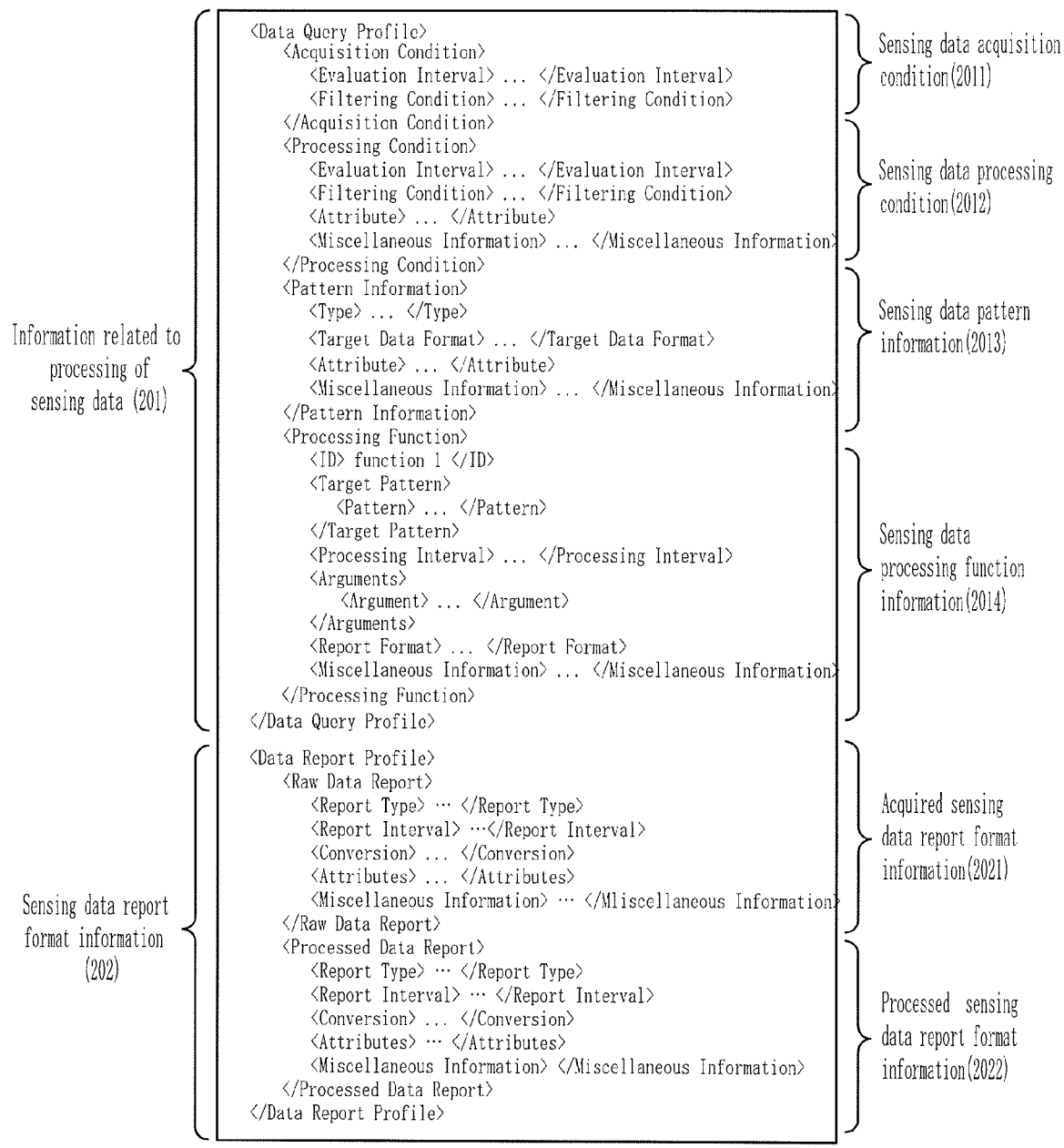
FIG. 2 illustrates user requirements in accordance with an embodiment of the present invention.

FIG. 2 illustrates user requirements in accordance with an embodiment of the present invention.

Referring to FIG. 2, the user requirements acquired by the user requirement acquiring unit 11 include information 201 related to processing of sensing data received from the user and the application service and sensing data report format information 202.

The sensing data processing information 201 includes sensing data acquisition conditions 2011, sensing data processing conditions 2012, sensing data pattern information 2013, and sensing data processing function information 2014.

The sensing data report format information 202 includes report format information 2021 about acquired sensing data and report format information 2022 about processed sensing data.

The sensing data acquisition conditions 2011 include sensing data transfer information from the sensor network 30, sensor network information, information about conditions for classifying the sensing data from the sensor network 30 into several groups according to the types and characteristics, information about conditions for classifying the sensing data acquired from the sensor network 30 into meaningful units, and information about conditions for determining whether to permanently store the sensing data acquired from the sensor network 30, whether to temporarily store the acquired sensing data, and whether to only process the acquired sensing data without storing the same. Examples of the sensing data transfer information include a transfer period and a transfer data type. Examples of the sensor network information include a sensing data acquisition method (wired or wireless) and protocol information.

The sensing data processing conditions 2012 include processing conditions for generating sensing data suitable for the application service, and information about conditions for determining whether to permanently store the processed sensing data, whether to temporarily store the processed sensing data, and whether to only process the processed sensing data without storing the same. For example, the format of the acquired sensing data may be changed or sensing data with a changed value may be generated. The generated sensing data may be considered as an input value of a processing function for acquiring the final results by processing sensing data.

The sensing data pattern information 2013 includes information about the main pattern of sensing data acquired from the sensor network 30 and information about several reference sensing data patterns for executing a sensing data processing function.

The sensing data processing function information 2014 includes information about the details, descriptions and factors of a function for processing sensing data.

The acquired sensing data report format information 2021 and the processed sensing data report format information 2022 include information about sensing data report formats such an XML format, a file format, and a Web service format and information about a sensing data report schema, e.g., information about a portion of the sensing data that is to be reported.

FIG. 3 illustrates the sensing data pattern information in accordance with an embodiment of the present invention.

Referring to FIG. 3, the sensing data pattern information in accordance with an embodiment of the present invention includes a sensing data pattern field 301 in the format of a character string or a character sequence, a sensing data pattern length field 302 for indicating information about the length of the sensing data pattern, a sensing data pattern frequency field 303 for indicating the frequency of the sensing data pattern, a sensing data pattern occurrence probability field 304 for indicating the occurrence probability of a sensing data pattern according to a predetermined condition, a sensing data processing function field 305 for indicating call information about a processing function that is to be executed for a predetermined pattern, and a miscellaneous field 306 for indicating information that is to be additionally maintained and stored.

The sensing data pattern length field 302, the sensing data pattern frequency field 303, the sensing data pattern occurrence probability field 304, the sensing data processing function field 305, and the miscellaneous field 306 may be maintained in a predetermined format and be included in the sensing data pattern information.

The sensing data pattern information may further include information about the processing contents requested by the user and the application service and information about the characteristics of sensing data that are to be processed.

Figure 4:
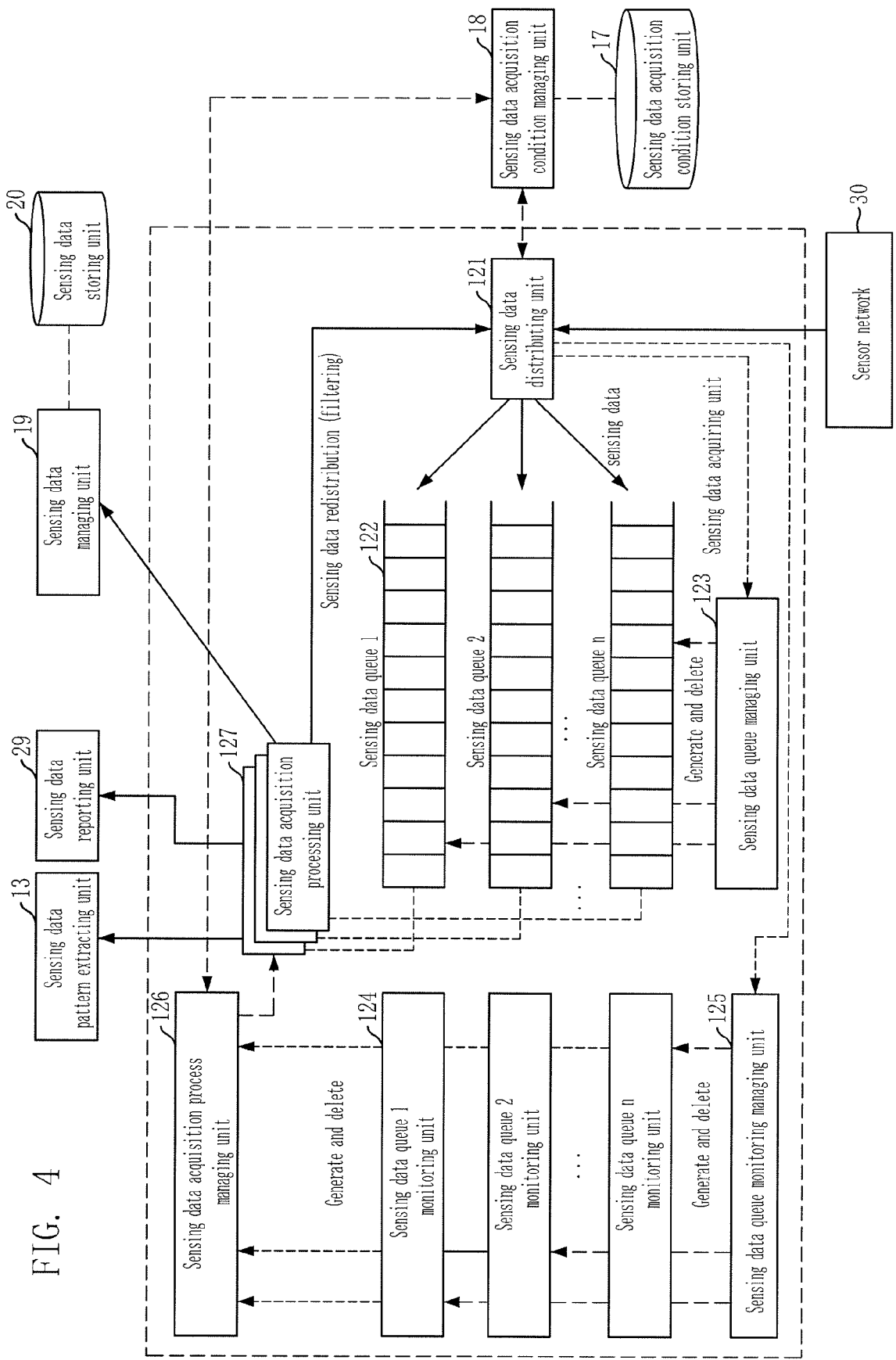
FIG. 4 is a block diagram of a sensing data acquiring unit in accordance with an embodiment of the present invention.

FIG. 4 is a block diagram of the sensing data acquiring unit 12 in accordance with an embodiment of the present invention.

Referring to FIG. 4, the sensing data acquiring unit 12 in accordance with an embodiment of the present invention includes a sensing data distributing unit 121, a plurality of sensing data queues 122, a sensing data queue managing unit 123, a plurality of sensing data queue monitoring units 124, a sensing data queue monitoring managing unit 125, a sensing data acquisition process managing unit 126, and a plurality of sensing data acquisition processing units 127.

Hereinafter, the functions of the units of the sensing data acquiring unit 12 will be described in more detail.

Based on the sensing data acquisition conditions received from the sensing data acquisition condition managing unit 17, the sensing data distributing unit 121 classifies sensing data acquired from the sensor network 30 and distributes the classified data to the sensing data queues 122, i.e., filtering.

The sensing data queues 122 accumulate the sensing data distributed by the sensing data distributing unit 121.

The sensing data queue managing unit 123 receives the sensing data acquisition conditions directly from the sensing data distributing unit 121 or from the sensing data acquisition process managing unit 126, generates/deletes the sensing data queues 122 based on the received sensing data acquisition conditions, and manages information about the generated/deleted sensing data queues 122. At the request of the sensing data distributing unit 121, the sensing data queue managing unit 123 transfers the information about the sensing data queues 122 to the sensing data distributing unit 121.

At this point, the sensing data queue managing unit 123 may transfer the information about the generated/deleted sensing data queues 122 to the sensing data queue monitoring managing unit 125.

The sensing data queue monitoring unit 123 monitors sensing data input to the sensing data queues 122. Upon detection of the input of the sensing data into the corresponding sensing data queue 122, the sensing data queue monitoring unit 123 requests the sensing data acquisition process managing unit 126 to generate or activate the corresponding sensing data acquisition processing unit 127 in order to process the input sensing data.

The sensing data queue monitoring managing unit 125 receives the information about the generated/deleted sensing data queues 122 from the sensing data distributing unit 121 or from the sensing data queue managing unit 123, generates/deletes the sensing data queue monitoring units 124 based on the received information about the generated/deleted sensing data queues 122, and manages information about the generated/deleted sensing data queue monitoring units 124. At this point, the sensing data queue monitoring managing unit 125 allocates the sensing data queue monitoring units 124 to the sensing data queues 122 on a one-to-one basis.

The sensing data acquisition process managing unit 126 generates the sensing data acquisition processing units 127 at the request of the sensing data queue monitoring units 124 for generation of the sensing data acquisition processing units or at the request of the sensing data queue monitoring units 124 for activation of the sensing data acquisition processing units. The sensing data acquisition process managing unit 126 transfers the sensing data acquisition conditions, which have been received from the sensing data acquisition condition managing unit 18, to the generated sensing data acquisition processing units 127.

Also, at the request of the sensing date queue managing unit 123 for the sensing data acquisition conditions, the sensing data acquisition process managing unit 126 transfers the sensing data acquisition conditions, which have been received from the sensing data acquisition condition managing unit 18, to the sensing data queue managing unit 123.

Based on the sensing data acquisition conditions received from the sensing data acquisition process managing unit 126, the sensing data acquisition processing units 127 acquire and process the sensing data accumulated in the sensing data queues 122.

The acquisition processing by the sensing data acquisition processing units 127 means classifying the sensing data accumulated in the sensing data queues 122 into meaningful units, determining whether to store the sensing data in the acquired sensing data storing unit 20, i.e., whether to transfer the sensing data to the acquired sensing data managing unit 19, whether to transfer the sensing data to the sensing data pattern extracting unit 13, whether to transfer the sensing data to the sensing data reporting unit 29, and whether to transfer the sensing data distributing unit 121 on the basis of the sensing data acquisition conditions, and transferring the sensing data according to the determination results.

Examples of the classifying of the sensing data into meaningful units by the sensing data acquisition processing units 127 include disregarding predetermined sensing data, leaving a log every time when the sensing data are acquired from the sensor network 30, and determining whether the value of the sensing data is within the valid range.

Figure 5A:
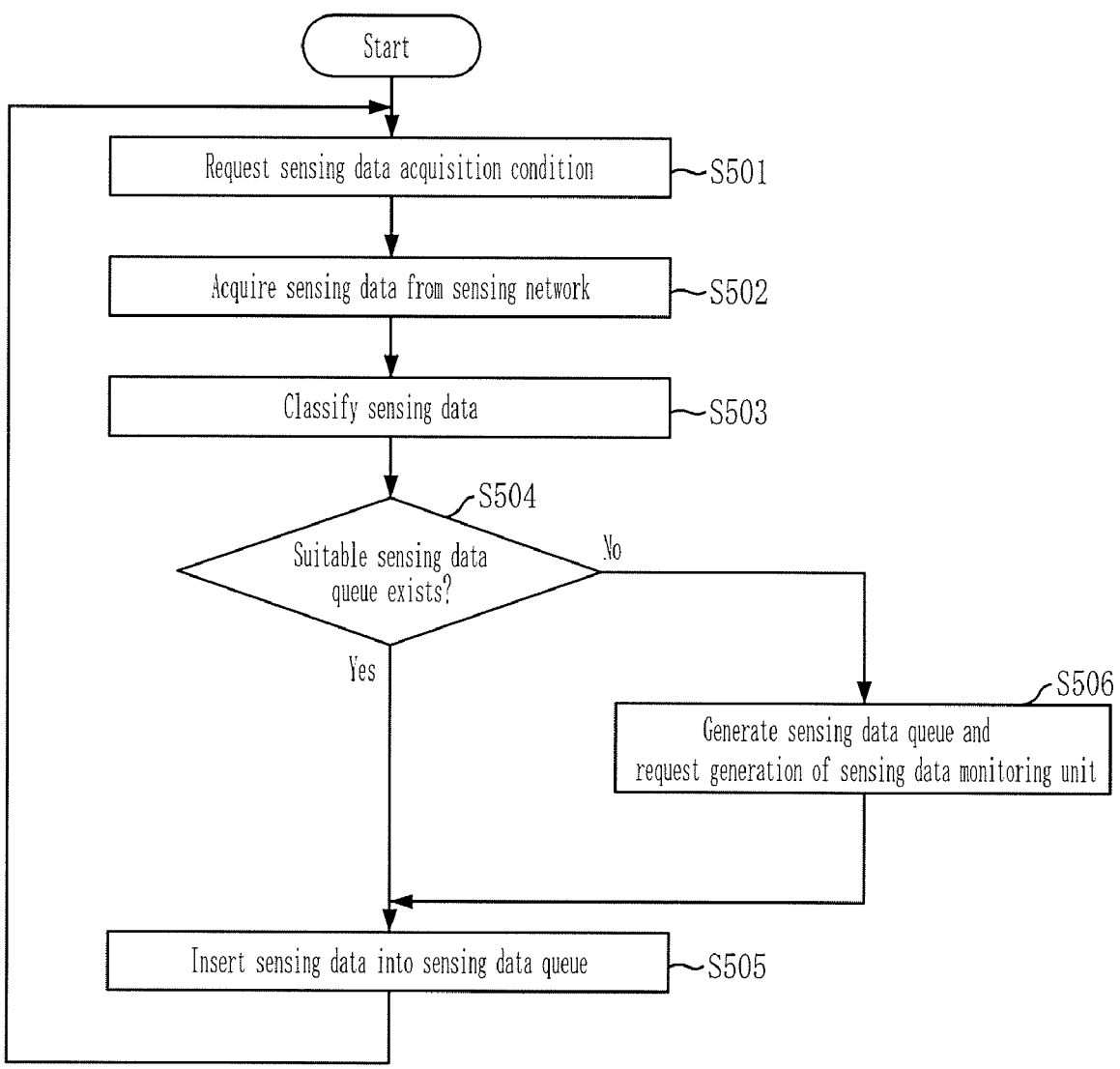
FIG. 5A is a flowchart describing a method for distributing sensing data in a sensing data distributing unit in accordance with an embodiment of the present invention.

FIG. 5A is a flowchart describing a method for distributing the sensing data in the sensing data distributing unit 121 in accordance with an embodiment of the present invention.

Referring to FIG. 5A, the sensing data distributing unit 121 requests the sensing data acquisition conditions from the sensing data acquisition condition managing unit 18, in step S501.

In step S502, the sensing data distributing unit 121 acquires the sensing data from the sensor network 30 according to the sensing data acquisition conditions received from the sensing data acquisition condition managing unit 18.

In step S503, the sensing data distributing unit 121 classifies the sensing data acquired from the sensor network 30 according to the sensing data acquisition conditions.

In step S504, the sensing data distributing unit 121 requests information about the sensing data queues 122 from the sensing data queue managing unit 123 and determines whether there is a sensing data queue 122 into which the sensing data classified for each of the sensing data acquisition conditions is to be inserted.

If there is a sensing data queue 122 into which the sensing data are to be inserted (in step S504), the method proceeds to step S505. In step S505, the sensing data distributing unit 121 inserts the sensing data into the sensing data queue 122. Thereafter, the method returns to step S501 and proceeds to step S502 to acquire another sensing data from the sensor network 30.

On the other hand, if there is no sensing data queue 122 into which the sensing data is to be inserted (in step S504), the method proceeds to step S506. In step S506, the sensing data distributing unit 121 requests the sensing data queue managing unit 123/the sensing data queue monitoring managing unit 125 to generate the sensing data queue/the sensing data queue monitoring unit.

At this point, the sensing data queue managing unit 123 may receive the sensing data acquisition conditions directly from the sensing data distributing unit 121 or may generate the sensing data queues 122 by requesting the sensing data acquisition conditions from the sensing data acquisition process managing unit 126. Also, the sending data queue monitoring managing unit 125 may generate the sensing data queue monitoring units 124 on the basis of the information about the generated/deleted sensing data queues 122 which has been received from the sensing data distributing unit 12 or the sensing data queue managing unit 12.

Thereafter, in step S505, the sensing data distributing unit 121 inserts the sensing data into the corresponding sensing data queue 122 generated by the sensing data queue managing unit 123.

Figure 5B:
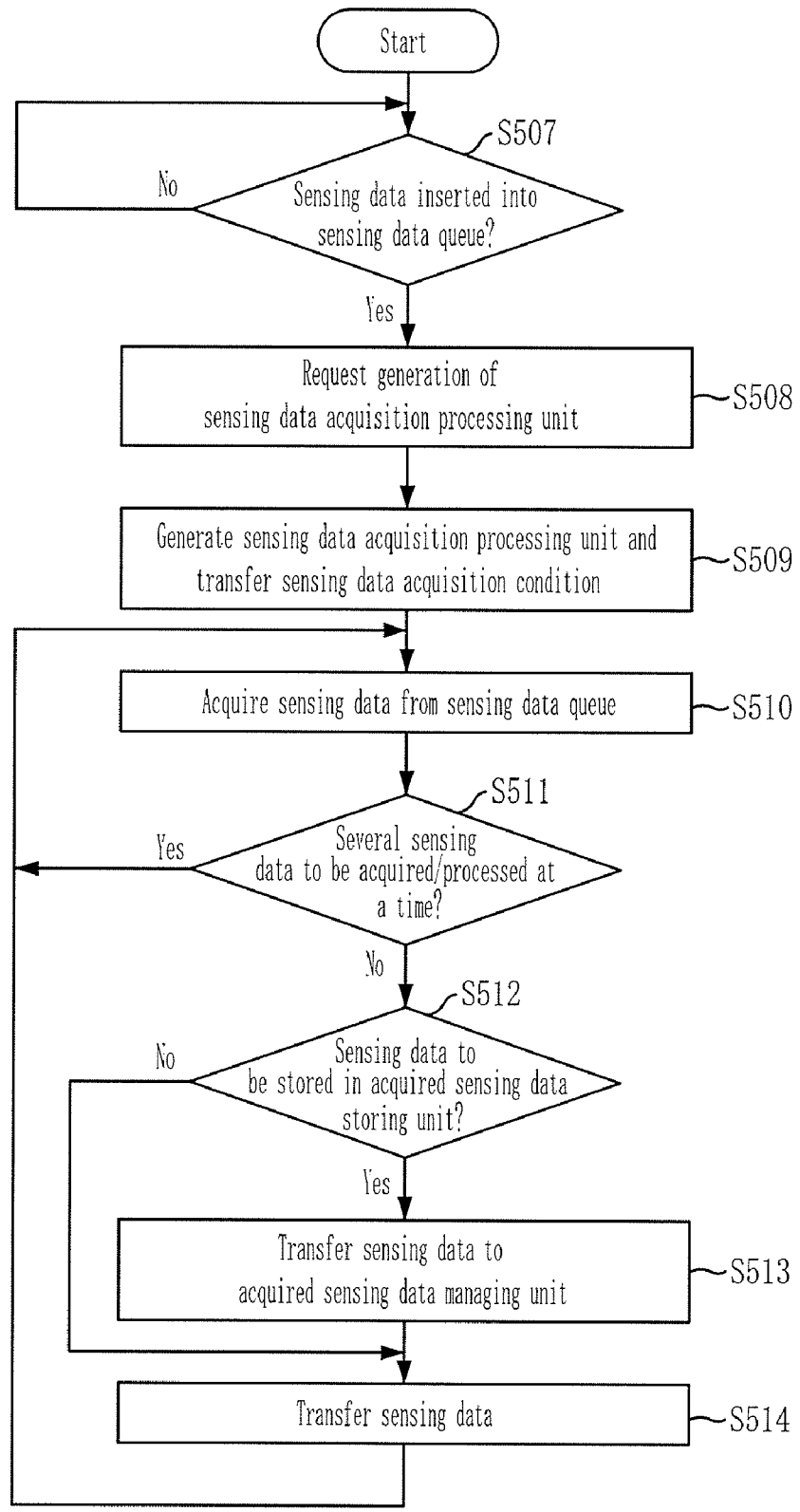
FIG. 5B is a flowchart describing a method for acquiring and processing sensing data in accordance with an embodiment of the present invention.

FIG. 5B is a flowchart describing a method for acquiring and processing sensing data in accordance with an embodiment of the present invention.

Referring to FIG. 5B, in step S507, the sensing data queue monitoring unit 124 monitors whether the sensing data are inserted into the sensing data queue 122.

If the sensing data are inserted into the sensing data queue 122 (in step S507), the sensing data queue monitoring unit 124 requests the sensing data acquisition process managing unit 126 to generate the sensing data acquisition processing unit, in step S508.

In step S509, the sensing data acquisition process managing unit 126 generates the sensing data acquisition processing unit 127 requested by the sensing data queue monitoring unit 124, and transfers the corresponding sensing data acquisition conditions to each of the sensing data acquisition processing units 127.

In step S510, the sensing data acquisition processing unit 127 acquires sensing data accumulated in the sensing data queue 122 according to the sensing data acquisition conditions. In step S511, the sensing data acquisition processing unit 127 determines whether the sensing data are to be acquired/processed simultaneously or on a one-by-one basis.

If the sensing data are to be acquired/processed simultaneously (in step S511), the method returns to step S510. That is, the sensing data acquisition processing unit 127 repeats step S510 to acquire sensing data from the sensing data queue 122 as many as to be processed simultaneously. On the other hand, if the accumulated sensing data are to be acquired/processed on a one-by-one basis (in step S511), the method proceeds to step S512. In step S512, the sensing data acquisition processing unit 127 determines whether the sensing data accumulated in the sensing date queue 122 are to be stored in the acquired sensing data storing unit 20, on the basis of the corresponding sensing data acquisition conditions.

If the sensing data are to be stored in the acquired sensing data storing unit 20 (in step S512), the method proceeds to step S513. In step S513, the sensing data acquisition processing unit 127 transfers the sensing data to the acquired sensing data managing unit 19.

In step S514, the sensing data acquisition processing unit 127 transfers the sensing data to the sensing data distributing unit 121, the sensing data pattern extracting unit 13, or the sensing data reporting unit 29 according to the corresponding sensing data acquisition conditions. Thereafter, the method returns to step S510 to repeat steps S510 through S514.

On the other hand, if the sensing data are not to be stored in the acquired sensing data storing unit 20 (in step S512), the method proceeds directly to step S514. In step S514, the sensing data acquisition processing unit 127 transfers the sensing data to the sensing data distributing unit 121 or the sensing data pattern extracting unit 13 according to the corresponding sensing data acquisition conditions. Thereafter, the method returns to step S510 to repeat steps S510 through S514.

Figure 6:
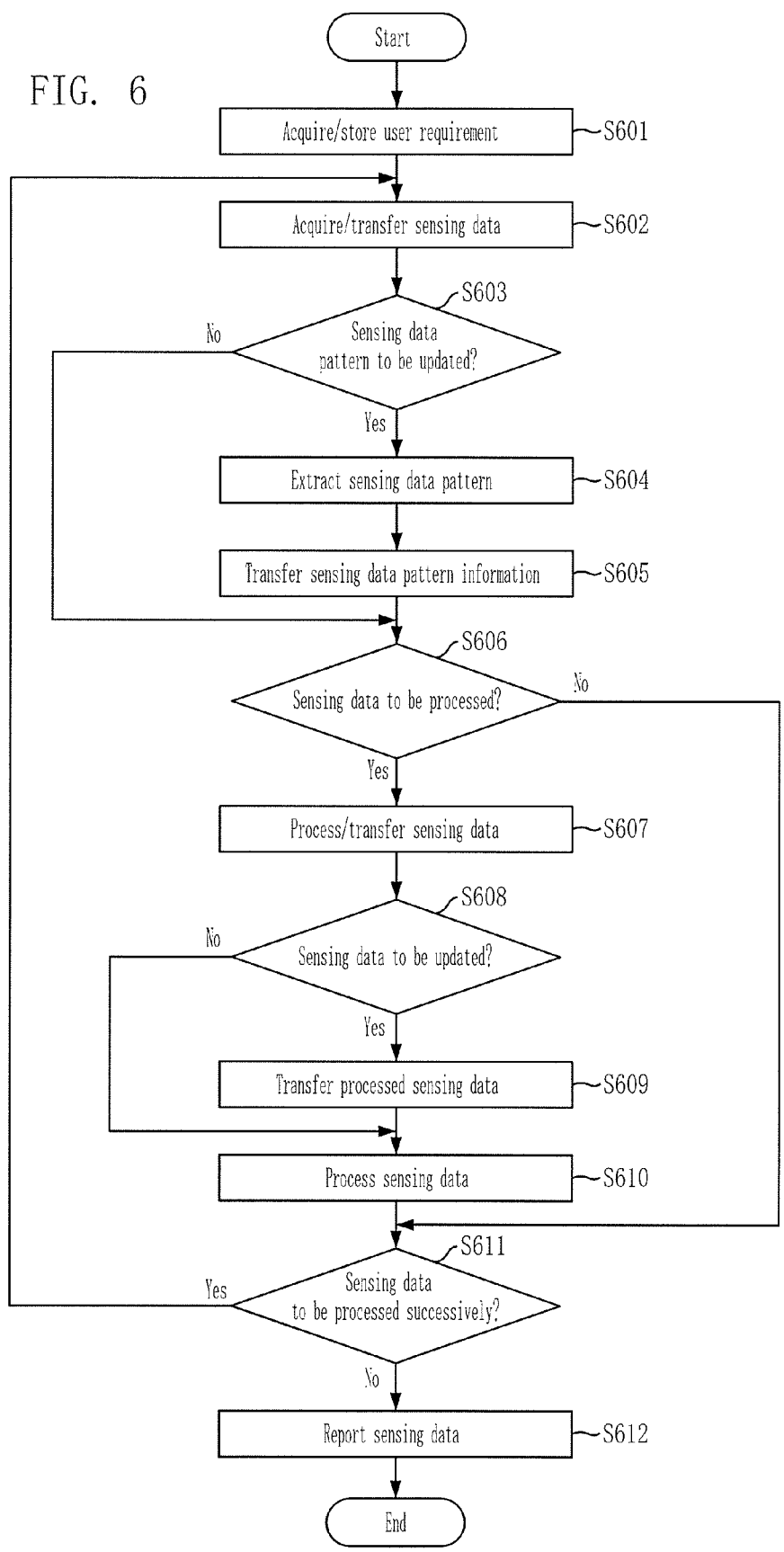
FIG. 6 is a flowchart describing a method for processing sensing data acquired from a sensor network in accordance with an embodiment of the present invention.

FIG. 6 is a flowchart describing a method for processing the sensing data acquired from the sensor network 30 in accordance with an embodiment of the present invention.

Referring to FIG. 6, in step S601, the user requirement acquiring unit 11 acquires user requirements from the user and the application service and transfers the acquired user requirements to the corresponding managing unit through the management interface unit 16.

In step S602, the sensing data acquiring unit 12 acquires sensing data from the sensor network 30 according to the sensing data acquisition conditions that are received from the sensing data acquisition condition managing unit 17, and transfers the acquired sensing data to the sensing data pattern extracting unit 13 and the sensing data reporting unit 29.

In step S603, the sensing data pattern extracting unit 13 determines whether the sensing data pattern is to be upgraded, i.e., extracted.

Among sensing data pattern information that are received by requesting the sensing data pattern managing unit 21 to transmit pattern information about the sensing data received from the sensing data acquiring unit 12 or the acquired sensing data managing unit 19, the sensing data pattern extracting unit 13 compares the sensing data pattern information extracted by the sensing data pattern extracting unit 13 with the sensing data pattern information received from the user requirement acquiring unit 11. If the sensing data pattern information extracted by the sensing data pattern extracting unit 13 is different from the sensing data pattern information received from the user requirement acquiring unit 11, the sensing data pattern is to be upgraded, i.e., extracted. On the other hand, if the sensing data pattern information extracted by the sensing data pattern extracting unit 13 is identical to the sensing data pattern information received from the user requirement acquiring unit 11, the sensing data pattern is not to be upgraded, i.e., extracted.

If the sensing data pattern is to be upgraded (in step S603), the method proceeds to step S604. In step S604, the sensing data pattern extracting unit 13 extracts the pattern for the sensing data acquired by the sensor network 30. In step S605, the sensing data pattern extracting unit 13 transfers the extracted sensing data pattern information to the sensing data pattern managing unit 21 and the sensing data generating unit 14 or the sensing data reporting unit 29.

On the other hand, if the sensing data pattern is not to be upgraded (in step S603), the method proceeds directly to step S606.

In step S606, on the basis of the sensing data processing conditions received from the sensing data processing condition managing unit 27, the sensing data generating unit 14 determines whether the sensing data from the sensing data acquiring unit 12 and the acquired sensing data managing unit 19 are to be processed.

If the sensing data are to be processed (in step S606), the method proceeds to step S607. On the other hand, if the sensing data are not to be processed (in step S606), the method proceeds directly to step S610. In step S607, the sensing data generating unit 14 processes the sensing data according to the sensing data processing conditions and transfers the processed sensing data to the sensing data processing unit 15 or the sensing data reporting unit 29.

In step S608, on the basis of the sensing data processing conditions, the sensing data generating unit 14 determines whether the sensing data are to be updated.

If the sensing data are to be updated (in step S608), the method proceeds to step S609. On the other hand, if the sensing data are not to be updated (in step S608), the method proceeds directly to step S610. In step S609, the sensing data generating unit 14 transfers the processed sensing data to the processed sensing data managing unit 23.

In step S610, on the basis of the external sensing data processing function, the internal sensing data processing function and the sensing data processing conditions, the sensing data processing unit 15 processes sensing data received from the sensing data acquiring unit 12 and the acquired sensing data managing unit 19, or sensing data received from the sensing data generating unit 14 and the processed sensing data managing unit 23.

In step S611, on the basis of the sensing data processing conditions, the sensing data processing unit 15 determines whether additional sensing data are to be processed.

Herein, the sensing data processing conditions are set by the user and the application service and include information about whether the sensing data are to be processed successively.

If the additional sensing data are not to be processed (in step S611), the method proceeds to step S612. In step S612, the sensing data processing unit 15 transfers the processed sensing data to the sensing data reporting unit 29.

On the other hand, if the additional sensing data are to be processed (in step S611), the method returns to step S602 to repeat steps S602 through S611.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

As described above, the present invention processes the sensing data according to the sensing data processing procedure set by the user and the application service, and provides a new application service according to the processing results, thereby making it possible to provide the optimized application service to the user.

While the present invention has been described with respect to the specific embodiments, it will be apparent to those skilled in the art that various changes and modifications may be made without departing from the spirit and scope of the invention as defined in the following claims.

What is claimed is:

1. A system for processing sensing data, the system comprising:
    a data processing condition managing unit for storing sensing data processing conditions, sensing data process conditions, and sensing data report format information in a sensing data processing condition storing unit and managing the stored data;
    a data processing function managing unit for storing sensing data processing function information in a sensing data processing function storing unit and managing the stored data;
    a processed data managing unit for storing processed sensing data in a processed sensing data storing unit and managing the stored data;
    a data pattern managing unit for storing sensing data pattern information in a sensing data pattern storing unit and managing the stored data;
    an acquired data managing unit for storing acquired sensing data in an acquired sensing data storing unit and managing the stored data;
    a data acquisition condition managing unit for storing sensing data acquisition conditions in a sensing data acquisition condition storing unit and managing the stored data;
    a user requirement acquiring unit for acquiring the sensing data acquisition conditions, the sensing data processing conditions, the sensing data pattern information, the sensing data processing function information, and the sensing data report format information from a user and an application service;
    a data acquiring unit for acquiring sensing data from a sensor network comprising a sensor that provides the sensing data on the basis of the sensing data acquisition conditions, wherein the data acquiring unit comprises a sensing data queue managing unit for generating/deleting one or more sensing data queues on the basis of the sensing data acquisition conditions: and a data distributing unit for classifying the sensing data acquired from the sensor network according to the sensing data acquisition conditions and distributing the classified sensing data to the corresponding sensing data queues;
    a data pattern extracting unit for extracting the pattern of sensing data received from the data acquiring unit and the acquired data managing unit on the basis of the sensing data pattern information received from the data pattern managing unit;
    a data generating unit for processing the sensing data received from the data acquiring unit and the acquired data managing unit according to the sensing data processing conditions received from the data processing condition managing unit; and
    a data processing unit for processing the sensing data received from the data acquiring unit and the acquired data managing unit or the processed sensing data received from the data generating unit and the processed data managing unit on the basis of the sensing data processing function and the sensing data processing conditions received from the data processing function managing unit and the data processing condition managing unit.

2. The system of claim 1, wherein the sensing data report format information includes report format information about the sensing data received from the data acquiring unit and the acquired data managing unit and report format information about the sensing data received from the data generating unit and the processed data managing unit.

3. The system of claim 2, wherein the data processing unit calls a user-level processing function (an external processing function) from the user requirement acquiring unit according to the processing results of the sensing data.

4. The system of claim 2, wherein the data acquiring unit includes:
    the one or more sensing data queues for accumulating sensing data for each of the sensing data acquisition conditions;
    one or more sensing data queue monitoring units generated for the corresponding sensing data queues to monitor whether sensing data are input into the sensing data queues;
    a sensing data queue monitoring managing unit for managing the generation/deletion of the sensing data queue monitoring units;
    a data acquisition processing unit for transferring the sensing data accumulated in the sensing data queues to the data reporting unit, the data managing unit, the data pattern extracting unit, or the data distributing unit according to the sensing data acquisition conditions; and a data acquisition process managing unit for generating the data acquisition processing units at the request of the sensing data queue monitoring units and transferring the sensing data acquisition conditions received from the data acquisition condition managing unit to the data acquisition process managing unit and the sensing data queue managing unit.

5. The system of claim 1, wherein the sensing data queue managing unit generates the sensing data queue for each of the sensing data acquisition conditions.

6. The system of claim 5, wherein the sensing data queue monitoring units are allocated to the sensing data queues on a one-to-one basis to detect the sensing data inputted into the corresponding sensing data queues.

7. A method for processing sensing data, the method comprising:

acquiring sensing data acquisition conditions, sensing data processing conditions, sensing data pattern information, sensing data processing function information, and sensing data report format information from a user and an application service;

acquiring sensing data from a sensor network comprising a sensor on the basis of the sensing data acquisition conditions, wherein the acquiring sensing data from the sensor network comprises generating/deleting one or more sensing data queues on the basis of the sensing data acquisition conditions; and classifying the sensing data acquired from the sensor network according to the sensing data acquisition conditions and distributing the classified sensing data to the corresponding sensing data queues;

checking whether the pattern of the acquired sensing data is to be updated on the basis of the sensing data pattern information, and extracting the sensing data pattern according to the check results;

determining whether the acquired sensing data are to be processed on the basis of the sensing data processing conditions, and processing the sensing data according to the determination results;

processing the acquired sensing data or the processed sensing data on the basis of the sensing data processing function information and the sensing data processing conditions; and reporting the acquired sensing data, the acquired sensing data pattern, the processed sensing data, and the process sensing data according to the sensing data report format information.

8. The method of claim 7, wherein the acquiring sensing data from the sensor network comprises:

determining whether the classified sensing data are to be processed one by one on the basis of the sensing data acquisition conditions;

transferring the classified sensing data to a data pattern extracting unit according to the determination results; and checking whether the classified sensing data are to be stored on the basis of the sending data acquisition conditions, and transferring the classified sensing data to an acquired data managing unit according to the check results.

9. The method of claim 8, further comprising:

transferring the classified sensing data to a data distributing unit if the classified sensing data are not to be processed one by one.

10. The method of claim 9, wherein the sensing data report format information includes report format information about sensing data received from a data acquiring unit and an acquired data managing unit and report format information about sensing data received from a data generating unit and a processed data managing unit.

* * * * *